Patented Sept. 16, 1947

2,427,481

UNITED STATES PATENT OFFICE 2,427,481

WATER-THINNED PAINTS

Glenn B. Weible, North Hollywood, and Robert J. Burns, Burbank, Calif., assignors to Lockheed Aircraft Corporation, Burbank, Calif.

No Drawing. Application November 1, 1943, Serial No. 508,640

33 Claims. (Cl. 106—141)

This invention relates to emulsified protective coating compositions and is a continuation-in-part of copending application Serial No. 465,796, filed November 16, 1942. This invention relates more particularly to the use of water for thinning the conventional types of paints, primers, varnishes, enamels, lacquers, and the like non-aqueous, water-insoluble industrial coating composition concentrates to consistencies suitable for brush, spray, or other means of application to surfaces of wood, metal, or the like materials.

Pigmented oil paints, varnishes, enamels, lacquers, shellacs, and the like types of coating compounds which employ non-aqueous, water-immiscible, vehicles containing volatile and non-volatile mineral and vegetable oils or the like non-aqueous organic solvents, diluents, driers, and carriers, are usually supplied to the consumer in the form of a heavy paste or in such concentrated form as to be non-fluid or highly viscous in consistency and are therefore required to be "thinned" or diluted, prior to use, with suitable quantities of thinners which heretofore have usually been the same as or similar to those non-aqueous liquids initially present in small quantity in the concentrate vehicle. In such oil paints of the pigment filled types, the concentrates usually comprise solid pigments and fillers of the various metallic and mineral compounds ground in oils which may carry in solution, both volatile and non-volatile constituents, certain gums and resins, and suitable siccatives. Likewise, in varnishes, lacquers, and enamels, which may or may not contain pigments, the vehicle may be a volatile solvent or a drying oil carrying a relatively large quantity of resins or resin forming materials. The quantity of such "thinner" required to be added to such paint, varnish, and enamel concentrates to reduce them to liquid consistencies suitable for brush or spray application to surfaces to be coated may range from approximately 30 to 80 percent by weight of the resulting thinned-concentrate mixture as a whole.

Thinners thus employed for this purpose in oil paints for example, may comprise suitable volatile solvents of mineral or vegetable origin including such aromatic solvents as xylene, toluene, benzene, turpentine, and such mineral oils as mineral spirits or light petroleum fractions, and also non-volatile vegetable drying oils such as linseed oil, soya bean oil, and tung oil, and plasticizers such as castor oil, and the like drying oils, semi-drying oils, and plasticizers.

In the case of lacquer concentrates largely comprising various natural or synthetic, dispersed or dissolved resins, plastics, and cellulose esters, and either with or without pigments as desired, the associated vehicle and its thinner-diluent carrier may comprise, for example, acetone, benzene, amylacetate, ethyl acetate, various alcohols, and light aromatic petroleum spirits, or various mixtures thereof.

In the case of varnishes usually not containing pigments, or in the case of varnish enamels which contain pigments, the body may comprise primarily a resin-forming drying oil or an oil containing natural resins or gums or synthetic resins, such as various alkyd or phenolic resins or mixtures thereof carried in mixtures containing either drying oils such as linseed oil, or in case of spirit varnishes volatile solvents which are usually free from drying oils.

In all of the beforementioned types of so-called oil paints, varnishes, enamels, and lacquers, it has heretofore been necessary, as hereinbefore stated, to thin the concentrates, prior to use, by addition of a relatively large quantity of a liquid vehicle similar to that already present in lesser quantity in the concentrate or by addition of diluents which are similar to or at least miscible with the said vehicles. This method of thinning the concentrates preparatory to application as protective coatings in general is wasteful inasmuch as the volatile thinner which is thus added to the base material in order to make it capable of being applied by spray, brush, or dipping, is usually allowed to evaporate into the air and escape beyond recovery. These volatile thinners usually do not enter into the composition of the protective coating formed but instead merely act as carriers for the material.

The various oils and solvents comprising the vehicles and thinners heretofore necessary to be admixed with the paint concentrates as before mentioned, add greatly to the expense of use of such paints and additionally are usually highly inflammable and toxic and at times scarce and difficult to obtain in sufficient quantity.

It is, therefore, an object of this invention to eliminate the necessity of employing additional non-aqueous thinners or vehicle diluents other than those contained in relatively small quantity in the oil-base or non-aqueous paint concentrates and to provide a method and materials for effectively increasing the fluidity of such base paint concentrates to substantially any value suitable for brush, dipping, or spray application without use of additional non-aqueous thinners or vehicle diluents but by use of substances which are at once inexpensive, convenient, safe and conservative of valuable materials.

The objects of this invention are accomplished in general by using water as the so-called diluent for the various oil-base paint, varnish, or lacquer concentrates to modify their characteristics from those of substantial plasticity or high viscosity to substantially any degree of fluidity suitable for the various well known methods of application to surfaces to be coated.

The objects of this invention are accomplished more specifically by a novel method of and novel dispersing medium for emulsifying the oil-base paint, varnish, lacquer, or the like oil or non-aqueous type coating composition concentrates, in water to form a fluid, oil-base paint-in-water emulsion.

It is well known that water emulsions have long been used for thinning protective coatings of various types. For example, the petroleum industry emulsifies asphalt to form a protective coating for roads, roofs, buildings, and the like uses. Similarly inexpensive water-thinned paints have been sold for popular use and these have in general been composed largely of casein containing various pigments. After evaporation of the water thinner the casein is left as an adherent coating which is thereafter practically insoluble in water.

It is also well known to form paints, varnishes, and the like coating materials by emulsification of the resins and oils together in water to form oil-water emulsions to be subsequently mixed with pigments to form coating materials in which water is chiefly the external phase and in which the water is inter-mixed with both the pigment and the resins. The emulsions thus formed are known to be unstable and the dried coatings formed by such water-paint mixtures are found to lack the desirable characteristic of a conventional oil paint and insofar as is known, water has not heretofore been successfully used as a thinner for a water-immiscible paint in such a manner as to preserve all of the desirable oil-base characteristics of the resultant coatings.

Furthermore, such emulsions tend to break down in a short time, necessitating in many cases, day-to-day preparation of the emulsions. Additionally, the processes heretofore required for forming the coating composition emulsions were complicated and usually beyond the experience and equipment of the average industrial user of such surface finishes. Moreover, the emulsifying agents and compositions heretofore known and employed are highly selective in their effectiveness with respect to the coating compositions, being inoperative to produce stable emulsions with many protective coating composition concentrates such as for example the zinc chromate anti-corrosion primers and the like finish materials having relatively water soluble pigments.

It has been discovered that the hereinbefore enumerated non-aqueous types of industrial paint and coating compositions in general may be thinned for use by emulsification in water in accordance with this invention, and without further addition of such non-aqueous vehicles or carriers or other thinners or solvents, may, by adjustment of the water content alone, be rendered sufficiently fluid for proper application to surfaces to be coated by substantially any desired application method. The resultant coating when dry and set will have characteristics substantially identical to those formed by conventional oil type of paint employing the usual non-aqueous vehicle thinners and diluents and will have none of the undesirable characteristics of the usual water-containing types of paints. It has further been discovered that the coating composition emulsions so formed are practically permanent and that the resultant dried protective films are in all cases of equal quality and have in many cases durability and protective qualities even superior to the conventional types of non-aqueous coatings.

The paint or coating emulsion which it has been discovered may be formed by employing suitable emulsifying agents and protective colloids, stabilizers and wetting agents as hereinafter more fully discussed, is one in which the water appears to be the continuous phase, with the non-aqueous coating concentrate as the dispersed phase. The fluidity of this emulsified mixture may therefore be readily modified to substantially any desired value by simply adding water. Upon application of the emulsion to a surface to be coated the emulsion quickly breaks, releasing the oil-base concentrate from the water to form a uniform oil-type coating film on the surface.

The dispersion of the paint or coating composition concentrate is accomplished in general by adding to a quantity of such paint or coating composition a dispersion medium comprising a mixture of an amido condensation product formed by the reaction of a higher-fatty-acyl-containing substance with an alkylene polyamine, or an alkylolamine, or an alkylol alkylene polyamine, with a protective colloid and usually a supplemental emulsifying agent capable of exerting a supplementary oil-in-water emulsifying action.

Referring first to the beforementioned fatty amido compound component of the dispersion medium, this compound may be any one of the type produced by the reaction of a fatty-acyl derivative containing from approximately 10 to approximately 22 and preferably from approximately 16 to approximately 22 carbon atoms with an alkylene polyamine, an alkylol polyamine or an alkylol alkylene polyamine.

In addition to the higher molecular weight fatty-acyl radical, such amides may also contain amidified therewith other short chain acyl radicals such as acetyl radicals. An example of a preferred substance coming within this latter class for employment in this invention is the fatty amide produced by reacting oleic acid and ethanol ethylene diamine in the presence of acetic acid to form N-oleyl, N'-(acetyl-2-hydroxyethyl) ethylene diamine. The structure of this compound may be diagrammatically expressed approximately as

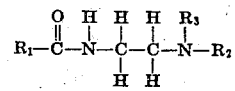

where $R_1$ is an aliphatic high molecular weight portion of a fatty acid (alkyl derivative); $R_2$ is the —2— hydroxyethyl radical, and $R_3$ is the acetyl radical. Amides coming within the beforementioned class and requirements may be conveniently formed by reacting rice oil or soya bean oil and acetic acid with diethylene triamine, or hydrogenated soyabean oil and acetic acid with ethanol ethylene diamine.

Higher molecular weight fatty acids which may be amidified as hereinbefore described are oleic, lauric, myristic, palmitic, stearic, hydroxystearic, and palmitoleic acids, and the like. The pure acids need not be used but fats and oils containing such fatty acid residues may be employed in the amidification reaction such as for example coconut oil, soyabean oil, lard, lard oil, tallow, peanut oil, corn oil, hydrogenated soyabean oil, rice bran oil, grain screenings oil, hydrogenated sardine oil, hydrogenated whale oil, hydrogenated castor oil, sperm oil, cod oil, sulfonated olive oil, linseed oil, tung oil, chinawood oil, and the like.

The amide substitution portion may be derived from any alkylene polyamine, alkylolamine or alkylol alkylene polyamine such as ethylene diamine, ethanolamine, diethylene triamine, ethanol ethylene diamine, tetraethylene pentamine, 1.3 diamine isopropanol, and the like.

The hereinbefore described condensation products will for convenience of description be hereinreferred to at times as fatty amides or amido compounds.

In most cases the fatty amido compound constituent of the dispersing medium mixture will not of itself supply sufficient emulsifying action in which cases it has been found necessary to include in the mixture a supplementary oil-in-water type emulsifying agent comprising sulfonated fatty materials such as sulfonated castor, olive, sardine, peanut, and the like oils, sulfonated fatty acids such as sulfonated oleic acid and sulfonated fatty esters such as sulfonated isobutyl oleate. In a few cases, however, it has been found possible to omit entirely such supplemental emulsifying agent.

As the protective colloid in the dispersion medium mixture of this invention, casein has been most satisfactory although other proteinaceous colloidal substances such as protein, glue, gelatin, lecithin, pectin, methylcellulose or the like may be employed in place of or in combination therewith. Casein being the preferred material for this purpose, it will be chiefly included in connection with the general description of this invention.

As hereinbefore stated, any of the industrial non-aqueous, water-immiscible coating compositions and paint concentrates which include, for example, the common drying oil-pigment paint concentrates, the oleoresinous varnishes, and enamels, the synthetic resin finishes, and the cellulose ester, nitrate, acetate, and ether lacquers and shellac coating materials may be dispersed and thinned-out with water by employing the beforementioned dispersion medium mixture in accordance with this invention. These coating composition concentrates which may be so water-thinned may include therewith any of the usual thinners, solvents, fillers, pigments, plasticizers, resins, driers, etc.

Referring now to the preparation of water-thinned non-aqueous coating compositions employing the hereinbefore described dispersing medium, the preferred method of forming and incorporating the said dispersing medium mixture with the coating composition to be water-thinned, or rendered water-thinnable, is as follows:

To the water in which the paint concentrate is to be dispersed a modicum of the protective colloid preferably of the protein type, such as casein, is added and in the case of casein the pH of the casein-water mixture is adjusted, by addition of a suitable base such as ammonia, to a value of approximately 7.5 or until the casein has formed a clear dispersed mixture in the water. The fatty amido compound and other emulsifying agent such as the sulfonated castor oil, may be separately dissolved in the coating composition concentrate material. The water-casein mixture is then slowly added, with constant vigorous stirring or other suitable agitation, to the paint or coating composition concentrate containing the fatty amido compound and emulsifying agents. The resultant emulsion of the coating composition in the water will have a fluidity, greater than the concentrate, as largely determined by the relative quantities of the thus treated concentrate and admixed water.

The following basic formulation illustrates, in general, the composition of the emulsified coating materials, sufficiently water-thinned for most uses but which may be further thinned by the addition of more water if desired. Proportions given are approximately preferred values and unless otherwise specified refer throughout the specification and claims to parts by weight.

a.

|  | Parts |
|---|---|
| Coating composition concentrate | 25.0– 65.0 |
| Fatty amido compound | 0.5– 10.0 |
| Emulsifying agent | 0.0– 7.0 |
| Aerosol OT (5% solution in water) | 0.0– 5.0 | b.

| Protective colloid | 3.0– 5.0 |
|---|---|
| Water to make | 100.0 |

The water protective colloid mixture (b) is generally prepared by mixing casein, or the like protective colloid, with water in which the pH is adjusted, by the addition of a suitable base, such as ammonia, to a value of approximately 7.5, or until a clear dispersion of the casein is effected. The coating composition concentrate, fatty amido compound, and the emulsifying agent of group (a) are separately mixed. The water-protective colloid mixture (b) is then added slowly to the prepared coating composition concentrate mixture (a), with constant stirring or agitation at ordinary temperatures until complete emulsification of the coating concentrate in the water is attained. The resulting emulsified mixture has a greatly increased fluidity compared to that of the original concentrate and in most cases is suitable for most conventional coating methods.

The invention is more fully illustrated by the following more specific examples in which, as before stated, the constituent proportions given are approximate preferred values and unless otherwise specified refer throughout the specification and claims to parts by weight.

*Example No. 1*

A mixture is made of the following:

a.

|  | Parts |
|---|---|
| Zinc chromate primer concentrate | 35.0 |
| N-oleyl, N'-(acetyl-2-hydroxyethyl ethylene diamine | 2.0 |
| Sulfonated castor oil (70%) | 1.0 |
| Aerosol OT (5%) | 2.0 |
|  | 40.0 |

A water dispersion of casein is separately prepared by mixing casein with water in which the pH is adjusted, by the addition of ammonia, to a value of approximately 7.5 or until a clear dispersion of the casein in water is effected. The proportion of dispersed casein water and ammonia are approximately as follows:

b.

|  | Parts |
|---|---|
| Water | 56.5 |
| Casein | 3.0 |
| Ammonia (28%) | 0.5 |

The thus adjusted water-casein mixture (b) is then added slowly, to the prepared primer concentrate mixture (a), with constant stirring or agitation at ordinary temperatures until complete emulsification is attained. The resulting emulsified mixture has a fluidity and consistency suitable for application by the conventional spray painting equipment. The dried coatings resulting from the spray application of this water-thinned primer upon surfaces such as aluminum alloy sheet metal panels, by actual weathering and accelerated weatherometer tests, are found to possess protective durability characteristics superior to those formed by the same primer-concentrate when thinned in the conventional manner by the usual "aromatic" thinner.

A typical zinc chromate primer concentrate which may be treated for water-thinning in the beforementioned manner has the initial consistency of a non-fluid paste and comprises the following ingredients in approximate percentage by weight: (AN-TT-P-656) Spec.

| | |
|---|---|
| Zinc yellow (pigment) | 27.7 |
| Magnesium silicate (filler) | 4.9 |
| Kopol #501 reduced Congo[1] | 2.4 |
| Rezyl #113 (60% in xylene) [2] | 26.6 |
| Bakelite #3962 (50% in xylene) [3] | 16.5 |
| Xylene | 20.4 |
| Maleic anhydride | 1.0 |
| Lead naphthenate | 0.4 |
| Cobalt naphthenate | 0.1 |
| | 100.0 |

[1] Natural Congo resin.
[2] Oil-modified glyceryl phthalate or alkyd type resin.
[3] Oil-modified phenol formaldehyde resin.

*Example No. 2*

Various water-thinned cellulose nitrate, cellulose acetate, or the like synthetic resin-type lacquer concentrates may be prepared approximately in accordance with the following procedure in which a mixture is prepared of the following constituents:

*a.*

| | Parts |
|---|---|
| A viscous lacquer concentrate | 35.0 |
| N-oleyl, N'-(acetyl-2-hydroxyethyl) ethylene diamine | 2.0 |
| Sulfonated castor oil (70%) | 2.0 |
| Aerosol OT (5%) | 2.0 |
| Hydroxyethylacetate | 6.0 |
| | 47.0 |

A water dispersion of casein is separately prepared by mixing casein with water in which the pH is adjusted by the addition of ammonia to a value of approximately 7.5 or until a clear dispersion of the casein in water is obtained. The proportion of the dispersed casein, water, and ammonia are approximately as follows:

*b.*

| | Parts |
|---|---|
| Water | 48.5 |
| Casein | 4.0 |
| Ammonia (28%) | 0.5 |
| | 53.0 |

The thus adjusted water-casein mixture (b) is then added slowly to the prepared lacquer concentrate mixture (a) with constant stirring or other suitable agitation as hereinbefore described in connection with the zinc chromate primer until complete emulsification is attained. The resultant emulsified mixture has a fluidity and consistency suitable for application by the conventional spray gun painting equipment. The coatings resulting from the application of this water-thinned lacquer upon surfaces such as aluminum alloy sheet metal panels by actual weathering tests and accelerated weatherometer tests possess protective and durability characteristics equal and superior to those of similar coatings formed of the conventional non-aqueous vehicle thinned lacquer.

A typical clear lacquer concentrate which by way of example may be employed in the above described water-thinned lacquer formulation is Army-Navy specification AN-TT-L-51 lacquer, the clear vehicle for which comprises the following ingredients in approximate percentage by weight.

| | |
|---|---|
| Paraplex RG-2 (60%) [1] | 18.5 |
| Amberloc B-94 (80%) [2] | 5.6 |
| Aroclor 5460 (100%) [3] | 4.3 |
| Ethyl cellulose (100%) | 4.3 |
| Cellulose nitrate (65%) | 9.4 |
| Ethyl alcohol | 3.5 |
| Ethyl acetate | 4.5 |
| Butyl alcohol | 12.4 |
| Butyl acetate | 22.4 |
| Aeromatic petroleum naphtha | 15.1 |
| | 100.0 |

[1] Oil-modified glyceryl sebacate resin.
[2] Oil-modified glyceryl phthalate resin.
[3] Chlorinated di-phenyl type varnish, lacquer and resins manufactured by Monsanto Chemical Co.

The clear lacquer concentrate may, if desired, carry substantially any suitable pigment which should be previously added to the concentrate in the usual manner. For example, various metallic compound pigments may be separately employed, such as Iron blue, in the approximate proportions of 20% pigment relative to the non-volatile ingredients of the clear base; also Aircraft gray (titanium oxide, aluminum paste, iron oxide) in the proportions of 30% pigment; Engine gray (titanium oxide, carbon black) in the proportion of 25% pigment, and Olive drab (lead chromate, iron oxide, carbon black, titanium, and lead oxides) in the proportion of 20% pigment with respect to the non-volatile ingredients of the clear lacquer base. The metallic compounds and proportions thereof comprising these and other suitable colors may be found in the Army-Navy aeronautical specifications for cellulose nitrate lacquer AN-TT-L-51 of July 28, 1941, as amended February 11, 1942.

*Example No. 3*

The present invention is found to be generally applicable to enamels and varnishes. For example, baking enamel concentrates of the glyceryl phthalate resin type comprising from 25% to 37% glyceryl phthalate resin, a suitable drier, and 8% to 25% metallic compound pigment in 50% to 55% of an aromatic hydrocarbon solvent having distillation characteristics comprising a 248° F. initial, 320° F. 50% fraction and 404° F. end point may be thinned with water as follows:

A mixture is prepared comprising:

*a.*

| | Parts |
|---|---|
| Enamel concentrate | 35.0 |
| N-oleyl, N'-(acetyl-2-hydroxyethyl) ethylene diamine | 2.0 |
| Sulfonated castor oil (70%) | 3.0 |
| Aerosol OT (5%) | 2.0 |
| Cellosolve acetate | 6.0 |
| | 48.0 |

A water dispersion of casein is prepared as before described in the approximate proportions as follows:

b.

| | Parts |
|---|---|
| Water | 47.5 |
| Casein | 4.0 |
| Ammonia (28%) | 0.5 |
| | 52.0 |

The casein-water mixture (b) is then added slowly to the prepared enamel concentrate mixture (a) with constant agitation until complete emulsification is accomplished. The resultant water-thinned enamel mixture has a fluidity and consistency suitable for application to surfaces to be coated by means of spray painting equipment. The resultant dried and baked coatings of the thus thinned enamel on metal have stability and durability characteristics equal to those formed by the conventionally thinned non-aqueous mixture enamels. Typical enamels which, by way of example, may be water-thinned in the beforementioned manner are of the quality and colors specified in the Army aeronautical specification E-5e.

Example No. 4

Varnishes have been found to be successfully water-thinned by the process of this invention. For example, a spar varnish concentrate which was water-thinned by this process comprised approximately 60% non-volatile to 40% volatile constituents, the non-volatile constituents of which comprised approximately 28% phenol-formaldehyde resin, 45% raw tung or China-wood oil, 2% castor oil, 25% linseed oil, and a small quantity of a suitable drier. The volatile constituents comprised approximately 5% normal butyl alcohol, 10% turpentine and 75% mineral spirits. The additive agents, percentages and method of emulsification were substantially the same as those specified hereinbefore and in Example I for the zinc chromate primer. The resultant water-thinned varnish is readily applied by means of a spray gun and the resultant dried coating is in every way comparable with that obtainable by the same varnish which has been thinned by the usual diluents.

Example No. 5

It was also discovered that shellacs can be water-thinned by the process of this invention. For example, a typical shellac concentrate comprising approximately 40% denatured ethyl alcohol and 60% orange and white shellac flakes may be water-thinned by forming a mixture as follows:

a

| | Parts |
|---|---|
| Shellac concentrate | 35.0 |
| N-oleyl, N'-(acetyl-2-hydroxymethyl) ethylene diamine | 2.0 |
| Sulfonated castor oil (20%) | 3.0 |
| Aerosol OT (5%) | 2.0 |
| Cellosolve acetate | 2.0 |
| | 44.0 |

A dispersion of casein in water in which the pH is adjusted to a value of approximately 7.5 is then separately prepared having the following approximate proportions:

b

| | Parts |
|---|---|
| Water | 51.5 |
| Casein | 4.0 |
| Ammonia (28%) | 0.5 |
| | 56.0 |

The water dispersion of casein (b) is then slowly added to the prepared shellac concentrate (a) with constant agitation until emulsification is complete. The resultant water-thinned shellac possesses a fluidity suitable for brush application and upon drying the coating is comparable in every way with that formed by shellac which has been diluted in the usual manner.

Example No. 6

A typical outside white house paint concentrate comprising the usual lead, zinc and titanium oxides and other metal compound pigments and mineral fillers ground in oils, comprising linseed oil and the usual driers and plasticizers, is water-thinned to brush coating consistency, as follows:

a

| | Parts |
|---|---|
| White lead-linseed oil paint concentrate | 35.0 |
| N-oleyl, N'-(acetyl-2-hydroxyethyl) ethylene diamine | 2.0 |
| Sulfonated castor oil (70%) | 2.0 |
| Aerosol OT (5%) | 2.0 |
| | 41.0 |

A dispersion of casein in water was prepared, as beforedescribed, having the following approximate proportions:

b

| | Parts |
|---|---|
| Water | 54.5 |
| Casein | 4.0 |
| Ammonia (28%) | 0.5 |
| | 59.0 |

The water dispersion of casein (b) was then added to the prepared paint concentrate mixture (a) with stirring or, preferably, by a mild homogenizing process to form a smooth emulsion. The set coating resulting from the brush application of the water-thinned house paint has durability and appearance equal to oil-thinned paints of the same or similar concentrate composition.

Although definite quantities of water have been specified in the beforementioned examples as being required to be added to the coating composition mixtures to adapt them to the specified manner of application such as by brush, spray, or dipping, wide variation in this quantity of water can be tolerated in such mixtures to meet the requirements of substantially any other method or apparatus for applying the protective coatings. If desired the quantity or proportion of added water can be materially reduced to form, in effect, a water emulsified concentrate which may be subsequently further thinned as desired by simply stirring in additional water. For example, the water content of the emulsion may be initially limited to approximately 10% to 20% of the mixture to form a water-thinnable emulsion concentrate which is stable and may be stored and distributed in that form. Final preparation of the emulsion concentrate for use at the point of consumption may then be conveniently accomplished by the simple admixture of approximately equal parts of concentrate and plain water or any other suitable quantity of water required to thin it to the consistency suitable for the method of application to be employed.

Various emulsification agents may possibly be employed but a 70% sulfonated castor oil, such as that obtainable from the National Oil Products Company, appears to be much more effective in this connection than any other similar agent as yet known. The wetting agent "aerosol OT" which has been found most effective is believed to comprise di-octyl sodium-sulfo-succinate, and is obtainable from the American Cyanamid Company. Insofar as the formation of a water-thinned oil base paint per se is concerned the wetting agent (aerosol OT) specified in the various examples, may be omitted. However, its presence is desirable to impart modified surface tension characteristics to the water-thinned paints which aid in the uniform spreading and impervious covering of various types of surfaces which it would not otherwise readily wet. Casein was found to be the most satisfactory protective colloid. Soya bean protein may also be employed with substantially equally good results, although possibly other protein types of colloidal material may be substituted with reduced effectiveness.

The dispersing agents included within the hereinbefore specified definition of the high molecular weight fatty amides or amido compounds may be obtained under the trade name of Nopco DPM.

The coating composition emulsifier or thinner of this invention may contain a wide variety of auxiliary materials as desired to modify the color and physical characteristics of the coating film. For example, it has been found to be advantageous to incorporate bentonite in small quantities in the emulsifier mixture to impart increased stability to the emulsion for long storage and also to toughen the film and increase its weather resistance. A small percentage of furfural alcohol has also been found beneficial in aiding the formation of a smooth film free from roughness due to minute agglomerations of certain of the coating composition solids prior to the solidification of the film.

The following is a typical example of an emulsified coating composition mixture employing bentonite and furfural alcohol.

*Example No. 7* a.

|  | Parts |
|---|---|
| Casein | 4.0 |
| Water | 19.6 |
| Ammonia (28%) | 0.6 | b.

|  |  |
|---|---|
| Bentonite (trade name Volclay) | 2.0 |
| Water | 20.0 | c.

|  |  |
|---|---|
| Aerosol OT. (5%) | 1.5 |
| Sulfonated castor oil (70%) | 3.0 | d.

|  |  |
|---|---|
| Sherwin-Williams PX3274 primer | 45.6 |
| N-oleyl, N'-(acetyl-2-hydroxyethyl) ethylene diamine | 3.0 |
| Furfural alcohol | 0.7 |
|  | 100.0 |

In the before outlined formulation, the water, casein, and ammonia mixture (a) were heated together at 75° C. for one and one-half hours. The bentonite and water mixture (b) were mixed together and added to the casein dispersion (a). Following this the aerosol OT and sulfonated castor oil (c) were added and mixed into the formerly mixed dispersions (a) and (b). Finally the primer and additive constituents (d) were stirred into the formerly mixed ingredients (a) (b) and (c) forming a viscous gray-green semi-thinned primer. The thus formulated semi-thinned primer was subsequently further thinned with approximately an equal amount of water and the resultant water-thinned coating material was suitable for spray application to metal surfaces such as aluminum alloy sheet metal panels.

It has also been found desirable in some cases where the coating composition does not inherently contain it, to impart a low concentration of chromium ions to the water-thinned coating composition and this may be accomplished by adding approximately 0.1% of ammonium chromate or ammonium dichromate to the coating compound concentrate or to the water prior to the addition of the water to the concentrate. The chromium ion in the presence of the casein protective colloid appears to result in coating films which are superior in durability to those formed by the same coating compounds when thinned and applied in the presence of the usual non-aqueous thinners.

*Example No. 8* a.

|  | Parts |
|---|---|
| $H_2O$ | 58.4 |
| Casein | 10.5 |
| Ammonia (28%) | 1.5 | b.

|  |  |
|---|---|
| Sulfonated castor oil | 8.6 |
| N-oleyl, N'-(acetyl-2-hydroxyethyl) ethylene diamine | 10.5 | c.

|  |  |
|---|---|
| Aerosol OT. (5%) | 10.5 |
|  | 100.0 |

The components (a) of casein and water were mixed together at a temperature of 140° F. and the casein dispersed in the water by addition of the ammonia. The components (b) of sulfonated castor oil, and the fatty amides compound were separately mixed at a temperature of 120° F. and mixed with the casein dispersion (a). The aerosol OT component (c) is finally added to the premixed components (a) and (b). The thus separately prepared dispersing medium was slowly added with vigorous stirring to the zinc chromate primer of Example No. 1 in the proportions of:

|  | Parts |
|---|---|
| Primer concentrate | 56.0 |
| Dispersing medium | 44.0 |
|  | 100.0 |

The resultant emulsion when diluted with approximately an equal amount of water and sprayed on to an aluminum alloy sheet metal panel surface, the resultant set film proved to have coverage and protective qualities superior to that formed by the same primer applied under the same conditions but solvent thinned in the conventional manner.

*Example No. 9*

The dispersion medium as prepared in Example No. 8 was employed for thinning a clear red lacquer (Frankfort Arsenal specification FXS 284) in the proportions of:

|  | Parts |
|---|---|
| Clear red lacquer concentrate | 56.0 |
| Dispersing medium | 44.0 |
|  | 100.0 |

The resultant emulsion was smooth and stable and the film formed by spray application of a one to one dilution thereof to a metal surface exhibited qualities equal to those with the same lacquer thinned with solvent.

As hereinbefore mentioned, it has also been found that the presence of a small quantity of tannic acid in the coating composition emulsions hereinbefore described, is beneficial in lending added toughness and also smoothness to the resulting finish coating film.

*Example No. 10* a.

|   | Parts |
|---|---|
| Casein | 7.2 |
| H₂O | 29.0 |
| Ammonia (28%) | 1.0 | b.

|   | Parts |
|---|---|
| N-oleyl, N'-(acetyl-2-hydroxyethyl) ethylene diamine | 5.3 |
| Aerosol OT. (5%) | 2.3 |
| Sulfonated castor oil (70%) | 4.3 | c.

|   | Parts |
|---|---|
| H₂O | 48.0 |
| Bentonite | 2.88 |
| Tannic acid | 0.02 |
|   | 100.00 |

The components (a) of casein, water, and ammonia were first mixed together at a temperature of 120° F. to form a clear dispersion of the casein in water. The components (b) consisting of the fatty amido compound, the sulfonated castor oil, and Aerosol OT were separately mixed at a temperature of approximately 130° F. and then added to and thoroughly mixed with casein dispersion components (b). Lastly, the bentonite, water and tannic acid components mixture (c) were added to the previously formed mixture of (a) and (b) and the whole mixture agitated for one-half to one hour. The resultant dispersion medium was employed for thinning zinc chromate primer concentrate having the formulation given hereinbefore in connection with Example No. 1, in the proportions of 55 percent thinner to 45 percent primer and the thus thinned composition sprayed on an aluminum panel. The resulting set coating was found to have superior qualities in regard to film smoothness and toughness. The primer concentrate thus thinned remained in the form of a stable, fine texture emulsion.

The quantity of bentonite may usually be varied between approximately 0.75 and approximately 3.00 parts by weight relative to the emulsifier mixture formulation of the type of Example 10 for best results, although the quantity of bentonite may be increased up to approximately 5 parts without detrimental effects. Likewise the tannic acid employed may similarly be varied between approximately .01 part and approximately .02 part for best results but up to as much as 0.1 part may be used. The tannic acid in addition to having a hardening effect upon the set coating film also imparts extreme fineness and smoothness of texture to the coating emulsion together with the substantially permanent stability required for storage and shipping conditions.

While in the foregoing description, typical examples of more or less standard type of prepared coating compound concentrates have been specified, such specific concentrates are not essential to the broad application of the present invention, since apparently any oil-type of coating compound such as paints, varnishes, enamels, lacquers, shellacs, and the like non-aqueous, water-immiscible coating compounds carrying natural or synthetic resins or plastics or resin and/or plastic forming materials dispersed or dissolved in non-aqueous, water-immiscible liquid vehicles containing volatile and/or non-volatile solvents, drying oils and plasticizers, and also carrying the usual paint pigments if desired, may be water-thinned in the manner of the present invention. A further essential condition, however, by which the present invention distinguishes over prior practices and which results in coatings of superior quality, resides in preventing contact of the resins and pigments with water either prior to or during the water-thinning process or during the final coating operations. This condition of protecting the resins or resin forming materials and pigments in the non-aqueous or oil type carrier to form a concentrate prior to any contact with water. Upon subsequent emulsification of the thus formed concentrate in water in the presence of the emulsifying and dispersing agents and protective colloids the dispersed particle retains its entity as an elementary quantity of coating compound concentrate carrying the resin, thinner, and pigment, free from water.

While preferred methods, materials, and compositions have been described hereinbefore by way of illustration, the invention is not to be limited thereby, but is intended to cover any variation therefrom which falls within the spirit of the invention and the scope of the claims.

We claim:

1. An emulsifier for rendering water-thinnable the concentrates of paints, varnishes, enamels, lacquers, shellacs, and the like non-aqueous, water immiscible, coating compositions, comprising a compound chosen from the group consisting of an acetylated high molecular weight fatty amide of alkylene polyamines, alkylol alkylene polyamines, and alkylol amines, a water soluble emulsifying agent, a protective colloid, and water.

2. An emulsifier according to claim 1 in which the emulsifying agent comprises sulfonated fatty oil.

3. An emulsifier for rendering water-thinnable the concentrates of paints, varnishes, enamels, lacquers, shellacs, and the like non-aqueous, water immiscible, coating compositions, comprising acetylated high molecular weight fatty amide of ethanol ethylene diamine, a water soluble emulsifying agent, a protective colloid, and water.

4. An emulsifier according to claim 3 in which the emulsifying agent comprises sulfonated fatty oil.

5. An emulsifier according to claim 3 in which the emulsifying agent comprises sulfonated fatty oil and the protective colloid comprises casein.

6. An emulsifier for rendering water-thinnable the concentrates of paints, varnishes, enamels, lacquers, shellacs, and the like non-aqueous, water immiscible coating compositions, comprising a sulfonated fatty oil, a protective colloid dispersed in water, and the amido condensation product of a fatty-acyl-derivative containing from approximately 10 to approximately 22 carbon atoms, ethanol ethylene diamine and acetic acid.

7. An emulsifier for rendering water-thinnable the concentrates of paints, varnishes, enamels, lacquers, shellacs, and the like non-aqueous water immiscible coating compositions, comprising a sulfonated fatty oil, a protective colloid dispersed in water, and the amido condensation product of a fatty-acyl-derivative containing from approximately 16 to approximately 22 carbon atoms, ethanol ethylene diamine and acetic acid.

8. An emulsifier for rendering water-thinnable the concentrates of paints, varnishes, enamels, lacquers, shellacs, and the like non-aqueous, water immiscible coating compositions, comprising approximately 2 parts of a sulfonated fatty oil, approximately 4 parts casein dispersed in water, and approximately 3 parts of the amido condensation product of a fatty-acyl-derivative containing from approximately 16 to approximately 22 carbon atoms, ethanol ethylene diamine and acetic acid.

9. An emulsifier for rendering water-thinnable the concentrates of paints, varnishes, enamels, lacquers, shellacs, and the like non-aqueous, water immiscible coating compositions, comprising from 0 to approximately 7 parts sulfonated oil, approximately 3 to approximately 5 parts casein, dispersed in approximately 10 to approximately 60 parts water, and approximately 0.5 to approximately 10 parts of an amido condensation product of a fatty-acyl-derivative containing from approximately 16 to approximately 22 carbon atoms, ethanol ethylene diamine and acetic acid.

10. An emulsifier according to claim 8 in which the amido condensation product comprises N-oleyl, N'-(acetyl - 2 - hydroxyethyl) ethylene diamine.

11. A water-thinnable coating composition comprising a mixture of a non-aqueous, water-immiscible coating composition concentrate chosen from the group consisting of paints, varnishes, enamels, lacquers, and shellacs, a compound chosen from the group consisting of the high molecular weight fatty amides of alkylene polyamines, alkylol alkylene polyamines, and alkylol amines, a water soluble emulsifying agent and a protective colloid dispersed in water, in such proportions as to produce a stable emulsion capable of forming upon drying, a smooth, continuous protective film.

12. A coating composition according to claim 11 in which the emulsifying agent comprises sulfonated fatty oil.

13. A water-thinnable coating composition comprising a mixture of a non-aqueous, water immiscible coating composition concentrate chosen from the group consisting of paints, varnishes, enamels, lacquers, and shellac, a compound chosen from the group consisting of an acetylated high molecular weight fatty amide of alkylene polyamines, alkylol alkylene polyamines, and alkylol amines, a water soluble emulsifying agent and a protective colloid dispersed in water, in such proportions as to produce a stable emulsion capable of forming upon drying, a smooth, continuous protective film.

14. A coating composition according to claim 13 in which the emulsifying agent comprises sulfonated fatty oil.

15. A water-thinnable coating composition comprising a mixture of a non-aqueous, water immiscible coating composition concentrate chosen from the group consisting of paints, varnishes, enamels, lacquers, and shellac, acetylated high molecular weight fatty amide of ethanol ethylene diamine, a water soluble emulsifying agent and a protective colloid dispersed in water, in such proportions as to produce a stable emulsion capable of forming upon drying, a smooth, continuous protective film.

16. A coating composition according to claim 15 in which the emulsifying agent comprises sulfonated fatty oil.

17. A coating composition according to claim 15 in which the emulsifying agent comprises sulfonated fatty oil and the protective colloid comprises casein.

18. A water-thinnable coating composition comprising a mixture of a non-aqueous, water immiscible coating composition concentrate chosen from the group consisting of paints, varnishes, enamels, lacquers, and shellac, a sulfonated fatty oil, a protective colloid dispersed in water, and the amido condensation product of a fatty-acyl-derivative containing from approximately 10 to approximately 22 carbon atoms, ethanol ethylene diamine and acetic acid, in such proportions as to produce a stable emulsion capable of forming upon drying, a smooth, continuous protective film.

19. A water-thinnable coating composition comprising a mixture of a non-aqueous, water-immiscible coating composition concentrate chosen from the group consisting of paints, varnishes, enamels, lacquers, and shellac, a sulfonated fatty oil, a protective colloid dispersed in water, and the amido condensation product of a fatty-acyl-derivative containing from approximately 16 to approximately 22 carbon atoms, ethanol ethylene diamine, and acetic acid, in such proportions as to produce a stable emulsion capable of forming upon drying, a smooth, continuous protective film.

20. A water-thinnable coating composition comprising a mixture of a non-aqueous, water immiscible coating composition concentrate chosen from the group consisting of paints, varnishes, enamels, lacquers, and shellac, approximately 2 parts of a sulfonated fatty oil, approximately 4 parts casein dispersed in water, and approximately 3 parts of the amido condensation product of a fatty-acyl-derivative containing from approximately 16 to approximately 22 carbon atoms, ethanol ethylene diamine and acetic acid, in such proportions as to produce a stable emulsion capable of forming upon drying, a smooth, continuous protective film.

21. A coating composition according to claim 20 and containing from 0 to approximately 7 parts sulfonated oil, approximately 3 to approximately 5 parts casein dispersed in approximately 10 to approximately 60 parts water, and approximately 0.5 to approximately 10 parts of the amido condensation product of a fatty-acyl-derivative containing from approximately 16 to approximately 22 carbon atoms, ethanol ethylene diamine, and acetic acid.

22. A coating composition according to claim 20 in which the condensation product comprises N-oleyl, N'-(acetyl-2-hydroxyethyl) ethylene diamine.

23. A water-thinnable lacquer having as its major constituent, a lacquer concentrate characterized by containing the usual nitro-cellulose, gum, resin, solvents and diluents, a compound chosen from the group consisting of the high molecular weight fatty amides of alkylene polyamines, alkylol alkylene polyamines, and alkylolamines, a water soluble emulsifying agent and a protective colloid dispersed in water, in such proportions as to produce a stable lacquer concentrate-in-water emulsion capable of forming upon drying a smooth continuous protective lacquer film.

24. A water-thinnable lacquer having as its major constituent a lacquer concentrate characterized by containing the usual nitro-cellulose, gums, resins, solvents and diluents, a compound chosen from the group consisting of the acetylated high molecular weight fatty amides of alkylene polyamines, alkylol alkylene polyamines, and alkylolamines, a water soluble emulsifying agent and a protective colloid dispersed in water in such proportions as to produce a stable lacquer concentrate-in-water emulsion capable of forming upon drying a smooth continuous protective lacquer film.

25. A water-thinnable lacquer according to claim 24 in which the acetylated high molecular weight fatty amide is N-oleyl, N'-(acetyl-2-hydroxyethyl) ethylene diamine.

26. A water-thinnable primer comprising as its major constituents zinc chromate, oil-modified alkyd resins, aromatic solvents, and diluents, a compound chosen from the group consisting of the high molecular weight fatty amides of alkylene polyamines, alkylol alkylene polyamines, and alkylolamines, a water soluble emulsifying agent and a protective colloid dispersed in water in such proportions as to produce a stable emulsion capable of forming upon drying a smooth, continuous, protective film.

27. A water-thinnable primer comprising as its major constituents zinc chromate, oil-modified alkyd resins, aromatic solvents and diluents, a compound chosen from the group consisting of the acetylated high molecular weight fatty amides of alkylene polyamines, alkylol alkylene polyamines, and alkylolamines, a water soluble emulsifying agent and a protective colloid dispersed in such proportions as to produce a stable primer concentrate-in-water emulsion capable of forming upon drying a smooth, continuous, protective primer film.

28. A water-thinnable primer according to claim 27 in which the acetylated high molecular weight fatty amide is N-oleyl, N'-(acetyl-2-hydroxyethyl) ethylene diamine.

29. A water-thinnable enamel having as its major constituents an enamel concentrate characterized by containing the usual glyceryl phthalate resin, drier, aromatic solvents and diluents, and metallic compound pigments, a compound chosen from the group consisting of the high molecular weight fatty amides of alkylene polyamines, alkylol alkylene polyamines and alkylolamines, a water soluble emulsifying agent and a protective colloid dispersed in water in such proportions as to produce a stable enamel-in-water emulsion capable of forming upon drying a smooth continuous protective enamel film.

30. A water-thinnable enamel having as its major constituents an enamel concentrate characterized by containing the usual glyceryl phthalate resin, drier, aromatic solvents and diluents, and metallic compound pigments, a compound chosen from the group consisting of the acetylated high molecular weight fatty amides of alkylene polyamine, alkylol alkylene polyamines and alkylolamines, a water soluble emusifying agent and a protective colloid dispersed in water in such proportions as to produce a stable enamel-in-water emulsion capable of forming upon drying a smooth continuous protective enamel film.

31. A water-thinnable enamel according to claim 30 in which the acetylated high molecular weight fatty amide is N-oleyl, N'-(acetyl-2-hydroxyethyl) ethylene diamine.

32. A water-thinnable coating composition comprising a mixture of a non-aqueous, water-immiscible coating composition concentrate chosen from the group consisting of paints, varnishes, enamels, lacquers and shellacs, a high molecular weight fatty amide of an alkylene polyamine, a water-soluble emulsifying agent and a protective colloid dispersed in water, in such proportions as to produce a stable emulsion capable of forming upon drying, a smooth, continuous protective film.

33. A water-thinnable coating composition comprising a mixture of a non-aqueous, water-immiscible coating composition concentrate chosen from the group consisting of paints, varnishes, enamels, lacquers and shellacs, a high molecular weight fatty amide of an alkylol amine, a water-soluble emulsifying agent and a protective colloid dispersed in water, in such proportions as to produce a stable emulsion capable of forming upon drying, a smooth continuous protective film.

GLENN B. WEIBLE.
ROBERT J. BURNS.

REFERENCES CITED

The following references are of record in the file of this patent:

UNITED STATES PATENTS

| Number | Name | Date |
| --- | --- | --- |
| 2,357,917 | Stull | Sept. 12, 1944 |
| 2,345,632 | Robinson | Apr. 4, 1944 |
| 2,206,090 | Haggenmacher | July 2, 1940 |
| 2,303,348 | Freeman et al. | Dec. 1, 1942 |
| 2,302,697 | Katzman | Nov. 24, 1942 |
| 2,290,411 | De Groote et al. | July 21, 1942 |
| 2,279,387 | Cheetham | Apr. 14, 1942 |
| 2,272,057 | Cheetham | Feb. 3, 1942 |
| 2,220,685 | Myers | Nov. 5, 1940 |
| 2,212,603 | Hollabaugh | Aug. 27, 1940 |
| 2,094,609 | Kritchevsky | Oct. 5, 1937 |
| 2,016,707 | Dike | Oct. 8, 1935 |